US009562294B2

(12) United States Patent
Woltering et al.

(10) Patent No.: US 9,562,294 B2
(45) Date of Patent: Feb. 7, 2017

(54) ALTERNATIVE INSTALLATION OF A GAS DIFFUSION ELECTRODE IN AN ELECTROCHEMICAL CELL HAVING PERCOLATOR TECHNOLOGY

(75) Inventors: Peter Woltering, Neukirchen (DE); Randolf Kiefer, Marl (DE); Rainer Weber, Odenthal (DE); Andreas Bulan, Alt Langenfeld (DE)

(73) Assignee: UHDENORA S.P.A., Milan (IT)

( * ) Notice: Subject to any disclaimer, the term of this patent is extended or adjusted under 35 U.S.C. 154(b) by 557 days.

(21) Appl. No.: 14/002,474

(22) PCT Filed: Apr. 7, 2012

(86) PCT No.: PCT/EP2012/001533
§ 371 (c)(1),
(2), (4) Date: Dec. 18, 2013

(87) PCT Pub. No.: WO2012/139741
PCT Pub. Date: Oct. 18, 2012

(65) Prior Publication Data
US 2014/0093810 A1 Apr. 3, 2014

(30) Foreign Application Priority Data
Apr. 15, 2011 (DE) .................. 10 2011 017 264

(51) Int. Cl.
H01M 8/04 (2016.01)
H01M 4/86 (2006.01)
(Continued)

(52) U.S. Cl.
CPC . *C25B 9/02* (2013.01); *C25B 9/08* (2013.01); *C25B 9/18* (2013.01); *H01M 4/86* (2013.01);
(Continued)

(58) Field of Classification Search
USPC ............... 429/507–511, 523–535, 188–246; 29/623.1–623.5
See application file for complete search history.

(56) References Cited

U.S. PATENT DOCUMENTS

| 1,971,763 A | 8/1934 | Allen et al. | |
| 2005/0173257 A1* | 8/2005 | Bulan | C25B 9/08 205/620 |
| 2005/0183951 A1 | 8/2005 | Oldani | |

FOREIGN PATENT DOCUMENTS

WO 03031690 4/2003

OTHER PUBLICATIONS

International Search Report issued in counterpart PCT Application No. PCT/EP2012/001533.

* cited by examiner

Primary Examiner — Basia Ridley
Assistant Examiner — Caitlin Wilmot
(74) Attorney, Agent, or Firm — Lucas & Mercanti, LLP

(57) ABSTRACT

The invention relates to an electrochemical cell comprising an anode and a cathode compartments separated by a membrane, having corresponding electrodes; said anode and cathode compartments each having an external wall, flanged areas designed like frames in the contact area of the compartments, and a gas diffusion electrode comprising a liquid-permeable carrier coated with a catalyst material; said gas diffusion electrode featuring an area not coated with catalyst at its bottom edge, said area, at the bottom end of the electrochemical cell, protruding between the flanged areas of the external wall of the cathode compartment and the flanged areas of the external wall of the anode compartment in the contact area of the compartments; a porous material arranged parallel between the gas diffusion electrode and the membrane, and devices for the supply and discharge of gas (Continued)

and electrolyte, with a gas space separated from an electrolyte space by appropriate means.

12 Claims, 3 Drawing Sheets

(51) Int. Cl.
  *C25B 9/02* (2006.01)
  *H01M 8/02* (2016.01)
  *C25B 9/08* (2006.01)
  *C25B 9/18* (2006.01)
(52) U.S. Cl.
  CPC ............ *H01M 8/028* (2013.01); *H01M 8/0276* (2013.01); *H01M 8/1007* (2016.02); *Y02E 60/50* (2013.01)

ALTERNATIVE INSTALLATION OF A GAS DIFFUSION ELECTRODE IN AN ELECTROCHEMICAL CELL HAVING PERCOLATOR TECHNOLOGY

This application is a U.S. national stage of PCT/EP2012/001533 filed on Apr. 7, 2012 which claims the benefit of priority from German Patent Application No. 102011017264.5 filed Apr. 15, 2011, the contents of each of which are incorporated herein by reference.

FIELD OF THE INVENTION

The present invention can be classed as being in the technical field of electrochemical equipment.

The present invention relates to an electrochemical apparatus as characterised in the preamble of claim 1. This defines an apparatus in which an electrochemical reaction takes place as, for instance, in the case of electrolysers, batteries, accumulators or fuel cells.

BACKGROUND OF THE INVENTION

During electrolysis, for example, electric power is converted into chemical energy. This is achieved through the decomposition of a chemical compound by means of an electric current. The solution used as electrolyte contains positively and negatively charged ions. Therefore, mainly acids, bases or salt solutions are used as electrolyte.

For example, in the case of the electrolytic production of halogen gases from aqueous alkali halide solution—here represented by sodium chloride—the following reaction takes place on the anode side:

$$4NaCl \rightarrow 2Cl_2 + 4Na^+ + 4e^- \quad (1)$$

The liberated alkali ions move to the cathode where they form caustic soda with the hydroxide ions generated there. Hydrogen is also formed:

$$4H_2O + 4e^- \rightarrow 2H_2 + 4OH^- \quad (2)$$

The caustic soda produced is separated from the alkali halide fed to the anode side by means of a cation exchange membrane, separation thus being achieved. Cation exchange membranes are state-of-the-art and commercially available from a number of different suppliers.

The standard potential generated at the anode by the formation of chlorine when reaction (1) above takes place is +1.36 V, with the standard potential at the cathode being −0.86 V when the above reaction takes place. A cell design of this type is known, for example, from WO98/55670. The difference between these two standard potentials yields an enormous influx of energy, which is required for these reactions to take place. In order to minimise this difference, gas diffusion electrodes (hereinafter referred to as GDEs) are used on the cathode side, meaning that oxygen is fed into the system with the result that reaction (2) is replaced by the following reaction at the cathode:

$$O_2 + 2H_2O + 4e^- \rightarrow 4OH^- \quad (3)$$

Oxygen can be supplied as pure gas or as air. The following overall reaction for chlor-alkali electrolysis using gas diffusion electrodes results:

$$4NaCl + O_2 + 2H_2O \rightarrow 4NaOH + 2Cl_2 \quad (4)$$

As the standard potential of reaction (3) is +0.4 V, GDE technology results in a considerable power saving compared with conventional electrolysis with hydrogen formation.

Gas diffusion electrodes have been used for many years in batteries, electrolysers and fuel cells. The electrochemical conversion takes place inside these electrodes at the so-called three-phase boundary only. Three-phase boundary is the term used for the area where gas, electrolyte and metallic conductor meet. For the GDE to work effectively, the metallic conductor should also be a catalyst for the desired reaction. Typical catalysts in alkaline systems are silver, nickel, manganese dioxide, carbon and platinum. To be particularly effective these catalysts must have a large surface area. This is achieved by finely divided or porous powders with an inner surface.

Problems in the use of such gas-diffusion electrodes as disclosed in U.S. Pat. No. 4,614,575, for example, are due to the fact that the electrolyte would penetrate into these fine pore structures due to capillary action and fill them up. This effect would make the oxygen stop diffusing through the pores, thus stopping the intended reaction.

For the reaction to take place effectively at the three-phase boundary, the above problem must be avoided by selecting the pressure ratios accordingly. A static liquid column would otherwise be formed in the electrolyte solution, which would cause the hydrostatic pressure to be highest at the lower end of the column, thus enhancing the phenomenon described above.

As documented in the relevant literature, this problem is solved by using falling-film evaporators. Here, the electrolyte, such as caustic soda solution NaOH or caustic potash solution KOH, is percolated through a porous material positioned between the membrane and the GDE, thus preventing the formation of a hydrostatic column. This is also referred to as percolation technology.

WO 03/42430 describes such an electrolysis cell, which utilises this principle for the chlor-alkali electrolysis reaction with an oxygen consumption reaction. Here, the oxygen is separated from the porous material by the gas diffusion electrode, and the GDE and the porous material—the percolator—are pressed together by means of a conductive support structure and a conductive flexible spring element.

The same kind of principle can also be found in DE102004018748, for example. This describes an electrochemical cell consisting of at least one anode compartment with an anode, a cathode compartment with a cathode and an ion exchange membrane arranged between the anode compartment and the cathode compartment, the anode and/or cathode being a gas diffusion electrode, and there being a gap between the gas diffusion electrode and the ion exchange membrane, an electrolyte inlet above the gap and an electrolyte outlet below the gap as well as a gas inlet and a gas outlet, the electrolyte inlet being connected to an electrolyte feed tank and having an overflow.

However, use of the gas diffusion electrode in the electrolytic apparatus described is not merely for the purpose of allowing the catalytic oxygen consumption reaction. The aim of the electrode is also to ensure the separation of electrolytes and gas on both sides of the GDE. For this, it is imperative to seal the gas diffusion electrodes gas tight and liquid tight by means of the selected anchoring method in order to ensure—particularly once the electrolyte has entered the cell—that the electrolyte is routed along the gas diffusion electrode as intended and does not reach the electrolyte outlet from the electrochemical cell via untight areas and thus alternative routes, consequently not being available for the reaction.

As the gas diffusion electrodes are subject to ageing and thus to wear, they must be replaced after a given operating period. The prior art envisages the gas diffusion electrodes being welded into the cathode compartments, which makes them work-intensive to replace.

This is elaborated, for example, in DE 103 30 232 A1. This describes an electrochemical compartment in which the GDE has an uncoated periphery that is connected to an anchoring structure equipped with an electrically conductive plate. This method of anchoring a GDE, which at the same time allows the electrolyte space to be sealed off from the gas space is, if anything, disadvantageous in combination with a percolator as it may lead to the percolator material being damaged and the electrolyte flow across the percolator being blocked. Moreover, when assembling this type of arrangement it is essential that the GDE is pushed an exact even amount under the electrically conductive plate 3 across the entire width of the electrochemical cell as otherwise the electric plate unevenly changes the free cross-sectional area available for liquid flow in the percolator arranged parallel thereto, which means that there is no guarantee that the liquid will be distributed evenly, which is essential if the electrochemical cell is to work properly. Ensuring even distribution is very difficult with an arrangement of this type.

An alternative method of anchoring the gas diffusion electrodes is defined in DE 101 52 792. This document describes a method for connecting a gas diffusion electrode to the basic structure of the electrolytic apparatus by means of an enclosing bent frame. As a pure clamping method, this method is more advantageous with regard to replaceability than that described in DE 103 30 232. However, as the frame and the basic structure are in this case also connected by welding or soldering in order to minimise ohmic losses, there are still the disadvantage regarding difficult replaceability and the loss of active electrode surface area due to welds.

It is therefore the objective of the present invention to find an alternative method for anchoring the gas diffusion electrode in an electrochemical cell to ensure ease of installation and removal, adequate sealing off of the gas space from the electrolyte space and provision of the biggest possible active electrode surface for the electrochemical reaction.

SUMMARY OF THE INVENTION

The objective is achieved by an electrochemical cell comprising an anode compartment (12) and a cathode compartment (11) that are separated from each other by a membrane (5) and have the corresponding electrodes, said anode compartment (12) and cathode compartment (11) each having an external wall (13), flanged areas designed like frames (14a, 14b, 15a, 15b) in the respective contact area of the two compartments, and a gas diffusion electrode (3) comprising a liquid-permeable carrier coated with a catalyst material, said gas diffusion electrode (3) featuring an area not coated with catalyst at its bottom edge (17), said area, at the bottom end of the electrochemical cell (16), protruding between the flanged areas of the external wall of the cathode compartment (15b) and the flanged areas of the external wall of the anode compartment (14b) in the contact area of the two compartments, and a porous material (8) being arranged parallel between the gas diffusion electrode (3) and the membrane (5), as well as devices for the supply and discharge of gas (20, 21) and electrolyte (9, 10), with a gas space (22) being separated from an electrolyte space (7) by appropriate means (23).

In particular, the present invention is characterised in that the electrolyte space (7) in the cathode compartment (11) is equipped with shaped internals (1) into which a top edge (19) of the gas diffusion electrode (3) protrudes, said top edge being fitted with a seal (2) that secures the gas diffusion electrode (3) in the shaped internals (1) and the gas diffusion electrode (3) having a bend radius α of <90 degrees relative to the perpendicular of the taut gas diffusion electrode.

Anchoring the gas diffusion electrode (3) in the electrolysis cell in accordance with the invention ensures that the gas space (22) is adequately sealed off from the electrolyte space (7) via the bend in the gas diffusion electrode (3). Moreover, the design of the shaped internals is guaranteed not to damage the porous material (8) used as percolator. Ease of membrane replacement is also guaranteed as there is no longer a need to anchor the electrode using methods such as welding, which complicate removal.

In an advantageous embodiment the top edge (19) of the gas diffusion electrode (3) which protrudes into the shaped internals (1) of the cathode compartment (11) has a bend radius α of 55-75 degrees relative to the perpendicular of the taut gas diffusion electrode.

Below the top edge (19) of the gas diffusion electrode (3) secured in the shaped internals (1) by means of a seal (2), there is optionally another layer, this preferably being of the same material as the gas diffusion electrode. This layer preferably refers to another piece of a gas diffusion electrode with or without a coating that is pushed under the actual gas diffusion electrode for further stabilisation and sealing.

According to the present invention the shaped internals (1) of the cathode compartment (11) may be of any geometric shape and preferably V-shaped or trapezoidal, with particular preference being given to a U shape.

Advantageously, the seals (2) provided in the shaped internals (1) at the top edge (19) of the gas diffusion electrode (3) are hollow section seals. In a preferred embodiment, these seals (2) are made of a material which is resistant to caustic soda and oxygen at temperatures of up to approx. 100° C.

The present invention also claims possible uses of the electrochemical cell according to the invention. Firstly, the electrochemical cell is intended for use in an electrochemical block where a plurality of electrochemical cells are arranged in stacks.

An electrochemical block refers to an apparatus which is made up of several electrically contacted plate electrochemical cells arranged side by side in a stack, said cells having inlets and outlets for all feed and product electrolytes and gases. In other words, it refers to several single elements connected in series, said elements each having electrodes that are separated from each other by a suitable membrane and fitted in a frame for holding these single elements. In the case of electrolysis this is accomplished, for example, by the use of electrolysers in which the electrolysis cells are arranged in stacks.

The present electrochemical cell is advantageously used as a battery in which chemical energy is converted into electric power via an electrochemical redox reaction.

The electrochemical cell can also be used as a fuel cell in which chemical energy is converted into electric power by adding a fuel and an oxidant.

BRIEF DESCRIPTION OF THE DRAWINGS

An embodiment of the invention is described in greater detail below by means of FIGS. 1, 2 and 3.

DETAILED DESCRIPTION OF THE INVENTION

Figure 1:
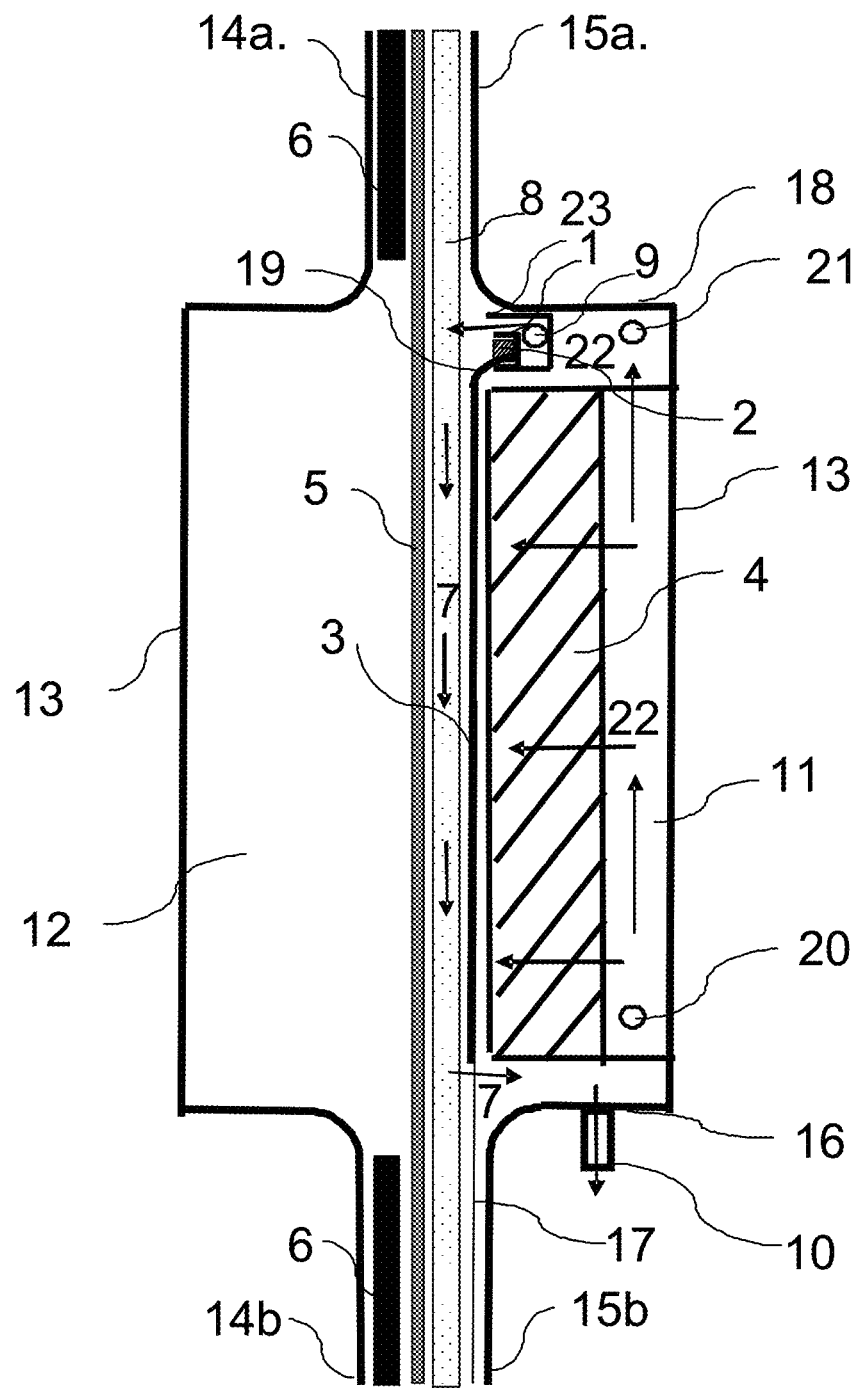
FIG. 1: General schematic diagram of an electrochemical cell according to the invention.
Figure 2:
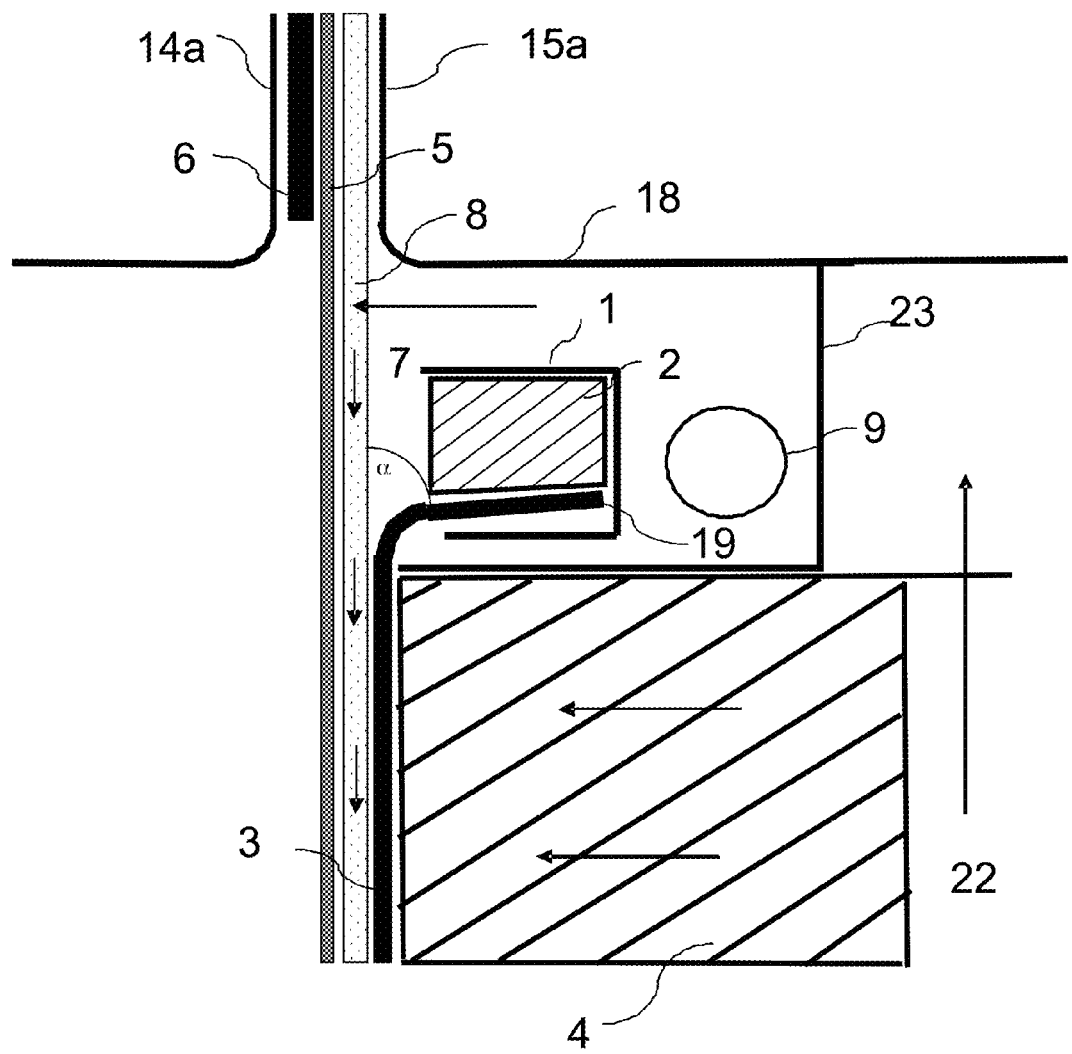
FIG. 2: Schematic diagram of the head section (top part) of an electrochemical cell according to the invention.
Figure 3:
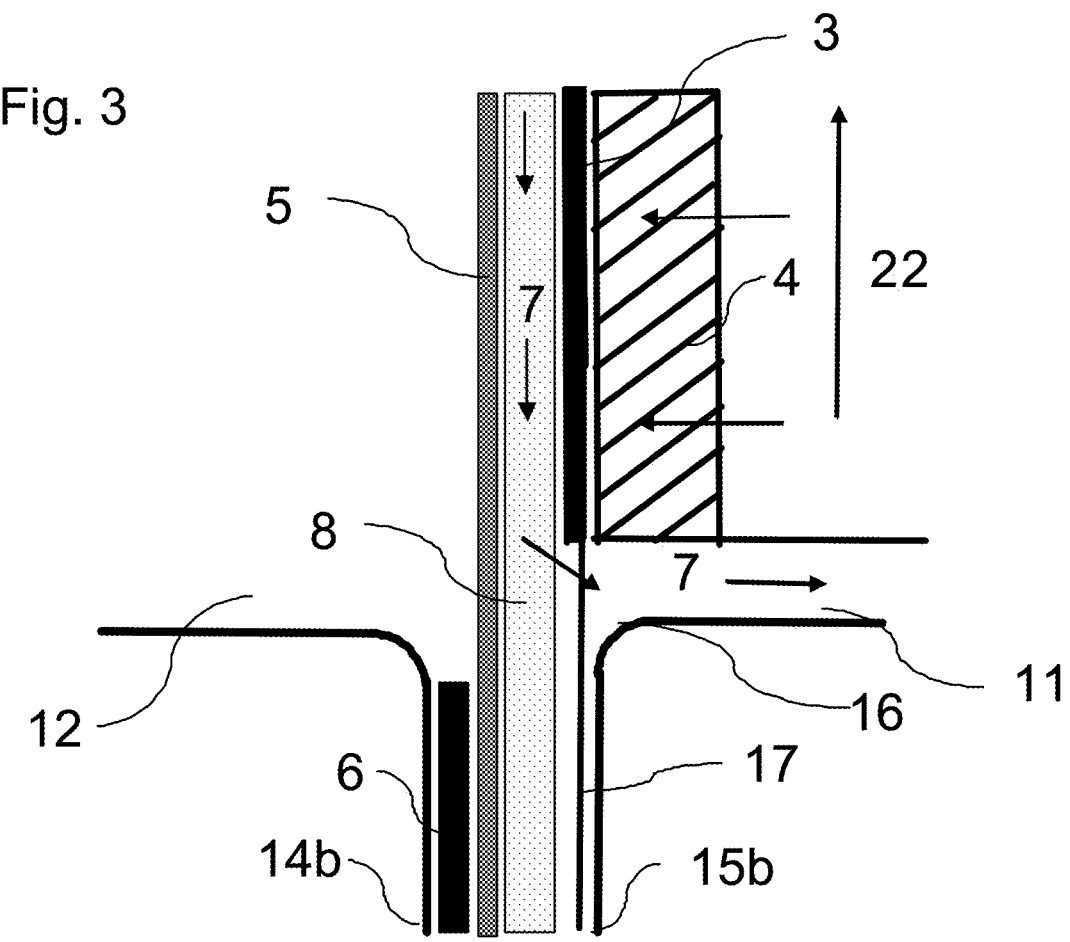
FIG. 3: Schematic diagram of the bottom section of an electrochemical cell according to the invention.

FIGS. 1, 2 and 3 show an electrochemical cell according to the invention, said cell comprising an anode compartment (12) and a cathode compartment (11) which are separated by a membrane (5). Both compartments (11, 12) have an external wall (13) and flanged areas designed like a frame (14a, 14b, 15a and 15b). The flanged areas of the cathode compartment (15a, 15b) and the flanged areas of the anode compartment (14a, 14b) form contact areas at the top end of the electrolysis cell (19) and the bottom end of the electrolysis cell (16), which serve to clamp the interior components, such as the membrane (5), porous materials (8), frame gaskets (6) and any other components. Anchoring of the membrane (5) and the porous materials (8) can be achieved, for example, via this clamping. In the operation of the electrochemical cell, the porous materials serve as percolator, with the electrolyte being passed between the membrane (5) and the gas diffusion electrode (3) from the top end of the electrolysis cell (19) to the bottom end of the electrochemical cell (16), said electrolyte flowing into the electrochemical cell via the electrolyte inlet (9). In this description the terms "top" or head section and "bottom" are based on this electrolyte flow.

The gas diffusion electrode (3) is held in the electrolysis cell by means of support members (4). The gas diffusion electrode (3) itself is made of a liquid-permeable carrier coated with a catalyst material. It is the catalyst-coated area of the gas diffusion electrode (3) that constitutes the active zone where the electrochemical cathode reaction takes place. This active zone includes the entire gas diffusion electrode except for the bottom edge (17), where an electrochemical reaction is not possible. This bottom edge (17) of the gas diffusion electrode 3 is clamped into the contact area of the frame-type flanged areas (14b) and (15b) of both compartments (11, 12) at the lower end of the electrolysis cell 16. FIG. 3 shows this configuration in detail. As the catalyst material carrier is liquid-permeable, the electrolyte can be directed through the carrier to a device via which the electrolyte leaves the electrochemical cell. The top end (19) of the gas diffusion electrode (3) is coated and is inserted into shaped internals for anchoring, where it is anchored by means of a seal (2). This configuration is shown in detail in FIG. 2. Here, the gas diffusion electrode 3 has a bend radius α of <90 degrees relative to the perpendicular of a taut gas diffusion electrode (3) which has been anchored in the electrolysis cell at its top end (18) and its bottom end (17). At the same time, the gas diffusion electrode (3) is clamped by means of a seal (2) in the shaped internals (1) located in the electrolyte space (7). The electrolyte space (7) is formed by means for separating the electrolyte space from the gas space (23). This readily removable method of anchoring the gas diffusion electrode (3) in the shaped internals (1) also means that the electrolyte space (7) can be adequately sealed off from the gas space (22) in the head section of the electrochemical cell via the bend in the gas diffusion electrodes (3).

Advantages Created by the Invention:
The gas diffusion electrode can be easily installed and removed
Anchoring the gas diffusion electrode according to the invention guarantees that the gas space is adequately sealed off from the electrolyte space A large active electrode surface is available for use for the electrochemical reaction.

LIST OF REFERENCE NUMBERS AND DESIGNATIONS

1 Shaped internals
2 Seal
3 Gas diffusion electrode
4 Support system
5 Membrane
6 Frame gasket
7 Electrolyte space
8 Porous material
9 Device for electrolyte supply
10 Device for electrolyte discharge
11 Cathode compartment
12 Anode compartment
13 External wall
14a, b Flanged area of anode compartment
15a, b Flanged area of cathode compartment
16 Bottom end of electrochemical cell
17 Bottom edge of gas diffusion electrode
18 Top end of electrochemical cell
19 Top edge of gas diffusion electrode
20 Device for gas supply
21 Device for gas discharge
22 Gas space
23 Means for sealing off electrolyte space from gas space

The invention claimed is:

1. An electrochemical cell comprising
an anode compartment and a cathode compartment that are separated from each other by a membrane and have the corresponding electrodes,
said anode compartment and cathode compartment each having a contact area, an external wall and each having flanged areas in the contact area of the two compartments,
a gas diffusion electrode comprising a liquid-permeable carrier coated with a catalyst material, said gas diffusion electrode featuring an area not coated with catalyst at its bottom edge, said area, at the bottom end of the electrochemical cell, protruding between the flanged areas of the external wall of the cathode compartment and the flanged areas of the external wall of the anode compartment in the contact area of the two compartments, and a porous material being arranged parallel between the gas diffusion electrode and the membrane,
devices for the supply and discharge of gas and electrolyte, with a gas space being separated from an electrolyte space by appropriate means,
wherein,
the electrolyte space in the cathode compartment is equipped with shaped internals into which a top edge of the gas diffusion electrode protrudes, said top edge being fitted with a seal that secures the gas diffusion electrode in the shaped internals and the gas diffusion electrode having a bend radius α of <90 degrees relative to the perpendicular of the gas diffusion electrode.

2. The electrochemical cell according to claim 1, wherein the top edge of the gas diffusion electrode, which protrudes into the shaped internals of the cathode compartment has a bend radius α of 55-75 degrees relative to the perpendicular of the gas diffusion electrode.

3. The electrochemical cell according to claim 1, wherein below the top edge of the gas diffusion electrode secured in the shaped internals by means of a seal, there is another layer.

4. The electrochemical cell according to claim 1, wherein the shaped internals of the cathode compartment are of any geometric shape.

5. The electrochemical cell according to claim 1, wherein the seal provided in the shaped internals on the top edge of the gas diffusion electrode is a hollow section seal.

6. The electrochemical cell according to claim 5, wherein the seal is made of a material which is resistant to caustic soda and oxygen at temperatures of up to approximately 100° C.

7. An electrolyser comprising a plurality of electrochemical cells according to claim 1 as electrolysis cells wherein the electrochemical cells are arranged in stacks.

8. A battery comprising the electrochemical cell according to claim 1, wherein chemical energy is converted into electric power via an electrochemical redox reaction.

9. A fuel cell comprising the electrochemical cell according to claim 1, wherein chemical energy is converted into electric power by adding a fuel and an oxidant.

10. The electrochemical cell of claim 4, wherein the shaped internals of the cathode compartment are V-shaped.

11. The electrochemical cell of claim 4, wherein the shaped internals of the cathode compartment are trapezoidal.

12. The electrochemical cell of claim 4, wherein the shaped internals of the cathode compartment are U-shaped.

* * * * *